(12) United States Patent
Kozhipuram et al.

(10) Patent No.: US 10,730,416 B2
(45) Date of Patent: Aug. 4, 2020

(54) ENERGY ABSORBING ASSEMBLY

(71) Applicant: AMI Industries, Inc., Colorado Springs, CO (US)

(72) Inventors: Akhil Rajagopal Kozhipuram, Karnataka (IN); Mahesh Virupaxi Hosmani, Karnataka (IN); Satya Swaroop Panda, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 141 days.

(21) Appl. No.: 15/963,129

(22) Filed: Apr. 26, 2018

(65) Prior Publication Data

US 2019/0016241 A1    Jan. 17, 2019

(30) Foreign Application Priority Data

Jul. 13, 2017   (IN) .............................. 201711024785

(51) Int. Cl.
| | | |
|---|---|---|
| *B60N 2/50* | (2006.01) | |
| *B60N 2/52* | (2006.01) | |
| *B60N 2/427* | (2006.01) | |
| *F16F 15/023* | (2006.01) | |
| *F16F 9/48* | (2006.01) | |
| *F16F 9/32* | (2006.01) | |
| *F16F 9/34* | (2006.01) | |

(52) U.S. Cl.
CPC ......... *B60N 2/502* (2013.01); *B60N 2/42736* (2013.01); *B60N 2/52* (2013.01); *F16F 9/3235* (2013.01); *F16F 9/34* (2013.01); *F16F 9/48* (2013.01); *F16F 15/023* (2013.01); *F16F 2230/0064* (2013.01); *F16F 2232/06* (2013.01)

(58) Field of Classification Search
CPC ...... B60N 2/502; B60N 2/42736; B60N 2/52; F16F 15/023; F16F 9/48; F16F 9/34; F16F 9/3235; F16F 2230/0064; F16F 2232/06
USPC ......................................................... 188/284
See application file for complete search history.

(56) References Cited

U.S. PATENT DOCUMENTS 1,078,885 A * 11/1913 Thomas .................... F16F 9/49
                                                                 188/284
1,242,103 A * 10/1917 Hunter ..................... F16F 9/49
                                                                 188/284

(Continued)

FOREIGN PATENT DOCUMENTS

WO         2011100936 A1      8/2011

OTHER PUBLICATIONS

European Search Report from the European Patent Office for EP Application No. 18183380.7 dated Dec. 19, 2018, 8 pages.

*Primary Examiner* — Xuan Lan Nguyen
(74) *Attorney, Agent, or Firm* — Cantor Colburn LLP

(57) ABSTRACT

An energy-absorbing assembly includes an outer assembly with an outer hollow cylindrical member, and an inner assembly with an inner hollow cylindrical member having an end disposed in the outer member. The inner and outer assemblies are axially movably engaged with each other and define first and second cavities separated by a membrane: a first cavity inside the outer hollow cylindrical member and a second cavity inside the inner hollow cylindrical member. An adjustable-size orifice is disposed between the first and second cavities, and is configured to reduce diameter in response to a stroke motion of the energy-absorbing assembly.

20 Claims, 5 Drawing Sheets

(56) References Cited

U.S. PATENT DOCUMENTS

| | | | |
|---|---|---|---|
| 1,921,121 A * | 8/1933 | Head | F16F 9/18 188/284 |
| 2,710,077 A * | 6/1955 | Fabel | F16F 9/3235 188/288 |
| 3,893,550 A * | 7/1975 | San Pablo De La Rosa | F16F 9/3214 188/322.19 |
| 4,094,492 A | 6/1978 | Beeman et al. | |
| 4,274,515 A * | 6/1981 | Bourcier de Carbon | F16F 9/066 188/269 |
| 4,819,770 A * | 4/1989 | Hahn | F16F 9/346 188/284 |
| 5,921,359 A * | 7/1999 | Holle | F16B 7/1463 188/271 |
| 6,394,393 B1 | 5/2002 | Mort | |
| 2004/0231934 A1 | 11/2004 | Heo | |

* cited by examiner

ENERGY ABSORBING ASSEMBLY

CROSS-REFERENCE TO RELATED APPLICATION

This application claims priority to Indian Patent Application No. 201711024785, filed Jul. 13, 2017, the disclosure of which is incorporated herein by reference in its entirety.

BACKGROUND

Exemplary embodiments pertain to the art of energy absorption or attenuation devices, and more particularly to occupant seating assemblies comprising such devices.

Energy management devices can be used in a variety of applications to absorb energy from impact or sudden deceleration, including but not limited to vehicle occupant protection, vehicle equipment protection, manufacturing processes (e.g., pounding or hammering). Numerous devices and system designs have been proposed and used, each of which may have its own advantages and disadvantages. However, although significant effort has been invested in the development of energy attenuation technology, there continues to be a desire for alternatives that may offer different features or capabilities.

BRIEF DESCRIPTION

Disclosed is an energy-absorbing assembly comprising an outer assembly comprising an outer hollow cylindrical member comprising a first end and a second end. An inner assembly comprises an inner hollow cylindrical member comprising a first end disposed in the outer hollow cylindrical member first end and a second end, and a radial support member affixed to or integrated with the inner hollow cylindrical member first end. The inner and outer assemblies are axially movably engaged with each other and define a first cavity inside the outer hollow cylindrical member between the outer hollow cylindrical member second end and the inner assembly radial support member, and a second cavity inside the inner hollow cylindrical member between the inner hollow cylindrical member first end and the inner assembly radial support. An adjustable-size orifice is disposed between the first and second cavities, and comprises a plurality of orifice members, at least one of which is movably engaged with the radial support. A rotatable actuator is engaged with and in an axially-fixed position with respect to the inner assembly. The actuator is helically movably engaged with the outer hollow cylindrical member and is configured to rotate in response to axial displacement between the inner and outer assemblies. The actuator also includes a cam surface engaged with the at least one radially movable orifice member, which is configured to displace the at least one movable orifice member along its movable engagement with the radial support. A fluid is disposed in the first cavity and a membrane blocks fluid flow through the orifice.

Also disclosed is an energy-absorbing assembly comprising an outer assembly comprising an outer hollow cylindrical member comprising a first end and a second end, and an inner surface comprising a helical groove and an axial groove. An inner assembly is affixed to or integrated with the inner hollow cylindrical member first end, and comprises an inner hollow cylindrical member comprising a first end disposed in the outer hollow cylindrical member first end and a second end, and a radial support member comprising a plurality of radial grooves. The inner assembly also includes a protrusion engaged with the outer hollow cylindrical member inner surface axial groove. The inner and outer assemblies are axially movably engaged with each other and define a first cavity inside the outer hollow cylindrical member between the outer hollow cylindrical member second end and the inner assembly radial support member, and a second cavity inside the inner hollow cylindrical member between the inner hollow cylindrical member first end and the inner assembly radial support. An adjustable-size orifice is disposed between the first and second cavities, and comprises a plurality of orifice members individually comprising a protrusion movably engaged with the radial support member radial grooves. A rotatable actuator is engaged with and in an axially-fixed position with respect to the inner assembly. The actuator comprises a protrusion movably engaged with the outer hollow cylindrical member inner surface helical groove, and is configured to rotate in response to axial displacement between the inner and outer assemblies. The actuator also includes a plurality of cam surfaces comprising curved extended protrusions engaged with the plurality of movably engaged orifice members, which are configured to displace the movable orifice members along their movable engagement with the radial support. A fluid is disposed in the first cavity and a membrane blocks fluid flow through the orifice.

Also disclosed is a method of assembling or repairing an occupant seating assembly comprising a seat frame and a support. According to the method, the seat frame is attached to one of the inner and outer assemblies of the above-described energy-absorbing assembly, and the other of the inner and outer assemblies of the above-described energy-absorbing assembly is attached to the support.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
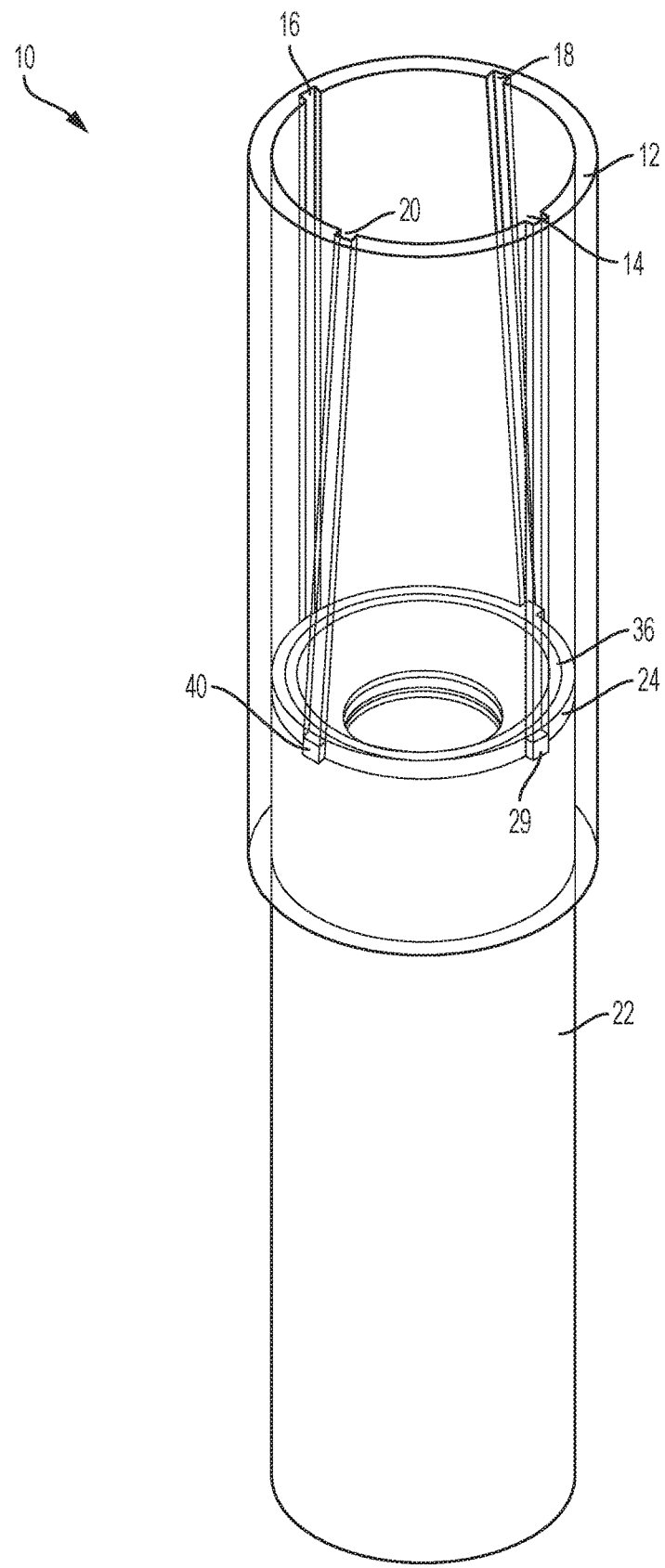
FIG. 1 is a schematic representation of an example embodiment of perspective view of an energy-absorbing assembly in a pre-stroke configuration.
Figure 2:
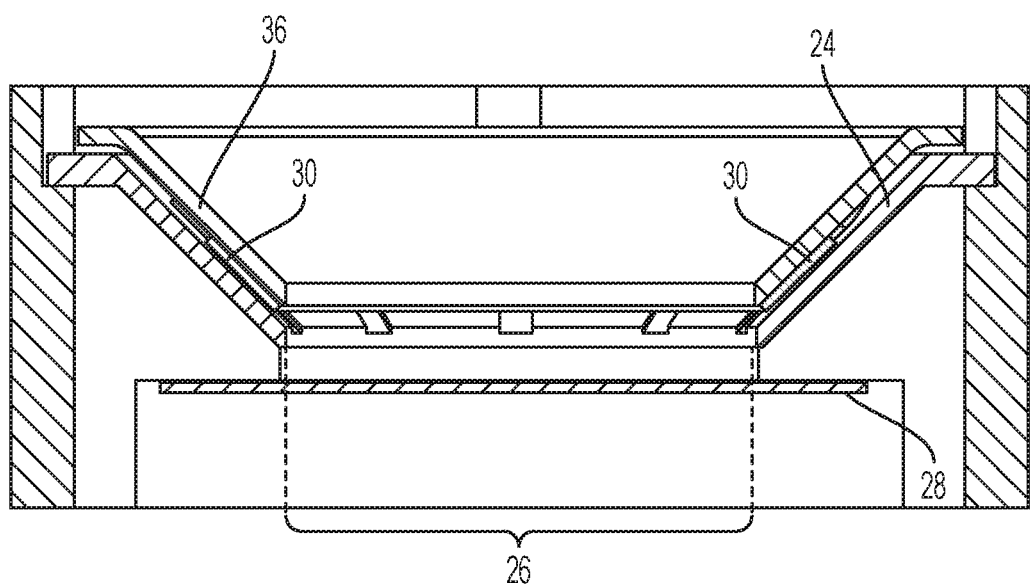
FIG. 2 is a schematic representation of an example embodiment of cross-section view of an orifice assembly in a pre-stroke configuration.

With reference now to FIGS. 1-6, an example embodiment of an energy-absorbing assembly 10 is schematically shown. As shown in FIG. 1, an outer assembly comprises an outer hollow cylindrical member 12 (also referred to hereafter as outer tube 12), which has a first or bottom end and a second or top end. The top end is shown as open to better illustrate internal features, but is typically closed and can be attached to a structural member such as an occupant seat frame (not shown). The inner surface of the outer tube 12 includes two axial (i.e., parallel to the cylinder axis) grooves 14 and 16 and two helical (i.e., disposed helically about the cylinder axis) grooves 18 and 20. An inner assembly comprises an inner hollow cylindrical member 22 (also referred to hereafter as inner tube 22), which has a first or top end disposed in the first end of outer tube 12 and a second or bottom end. The bottom end is typically closed and can be attached to a structural member such as a floor or other support (not shown). The top end of the inner tube 22 is open, and has a radial support member 24 affixed to or integrated with the inner tube 22. The position of the radial support member 24 is fixed with respect to the position of the inner tube 22. As the radial support member 24 extends from the perimeter of the inner tube 22 radially inward toward a central axis of the cylindrical tube, leaving open a central orifice 26, which is temporarily closed off by a membrane 28 (FIG. 2). In some embodiments, the radial support member can have a conical shape as shown in the Figures, but it can extend radially inward at other angles such as straight across (i.e., perpendicular to the cylindrical axis). The radial support member also includes protrusions 29 and 31, which are engaged in the outer tube axial slots 14 and 16 in order to guide the inner assembly in a sliding engagement with the outer tube 12.

Figure 3:
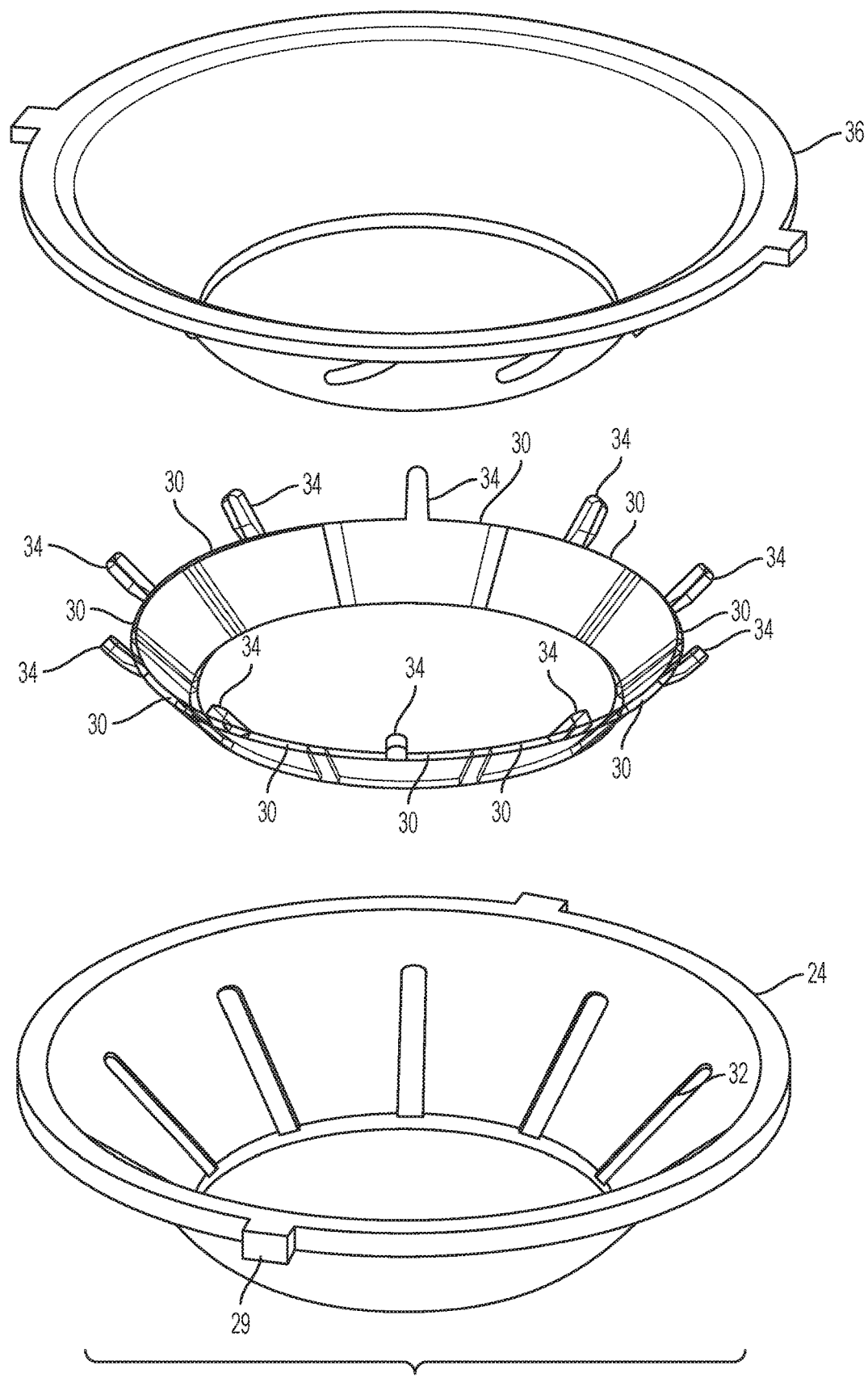
FIG. 3 is a schematic representation of an example embodiment of a radial support member.
Figure 4:
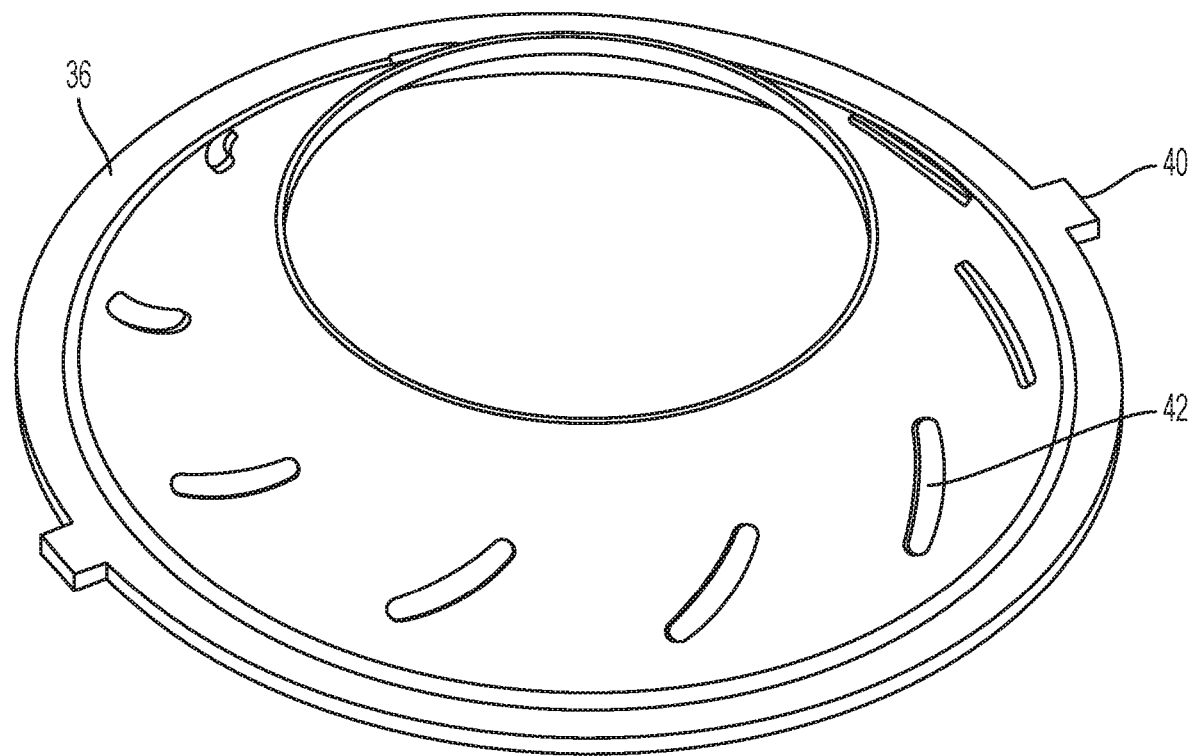
FIG. 4 is a schematic representation of an example embodiment of a rotatable actuator.
Figure 5:
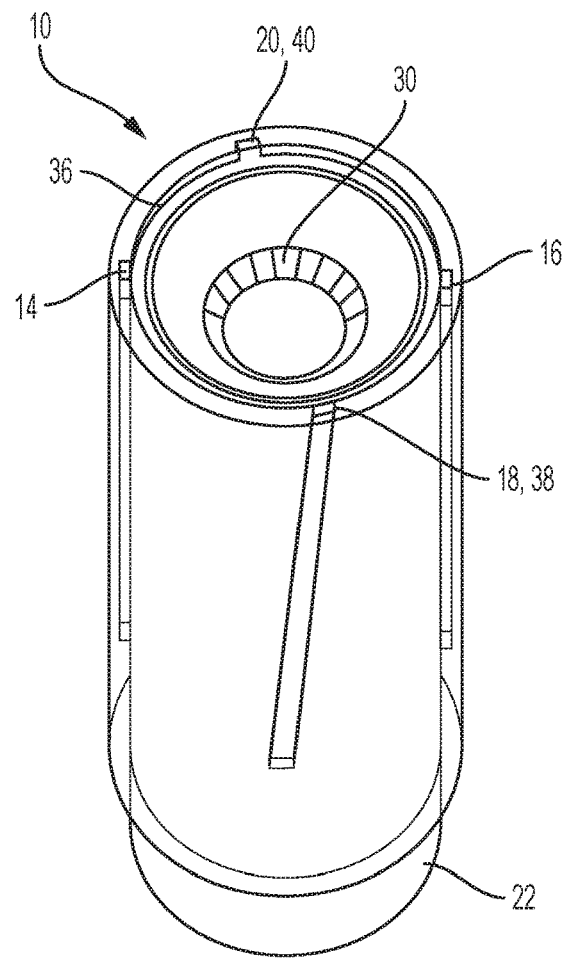
FIG. 5 is a schematic representation of an example embodiment of perspective view of an energy-absorbing assembly in a post-stroke configuration.
Figure 6:
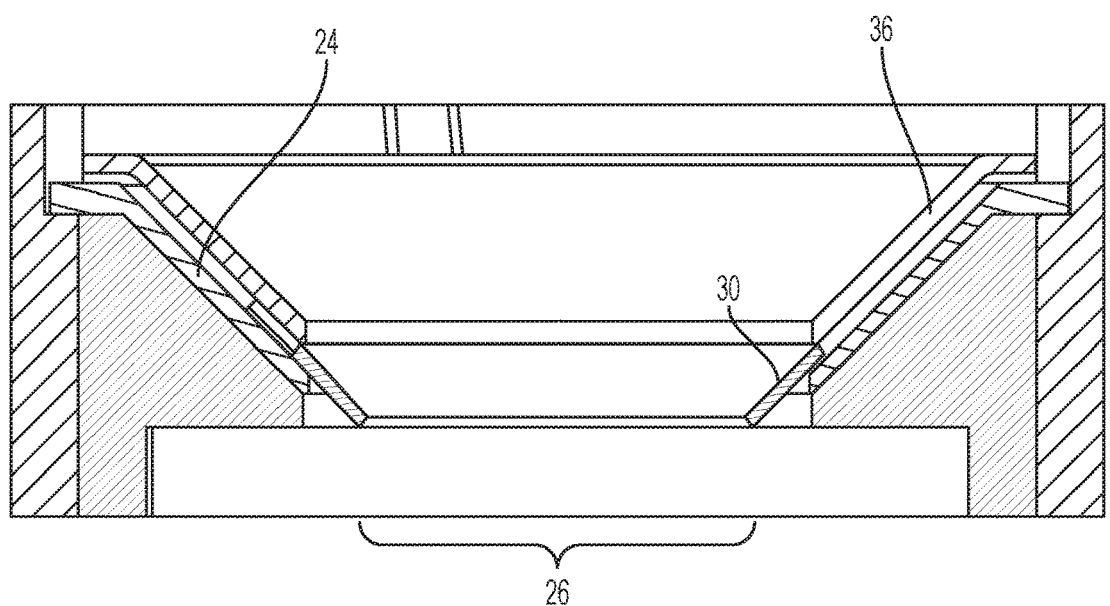
FIG. 6 is a schematic representation of an example embodiment of a cross-section view of an orifice assembly in a post-stroke configuration.

FIG. 2 schematically shows the radial support member 24 with orifice members 30 movably engaged with the radial support 24. In the example embodiment of FIG. 3, this engagement is provided by radial grooves 32 in the radial support 24 engaged by projections 34 on the orifice members 30. This engagement between the radial support 24 and the orifice members 30 allows for movement of the orifice members 30 on the radial support 24, with movement restricted to the radial direction along the radial grooves 32. The orifice members 30 are also engaged on the opposite side with a rotatable actuator 36. The outer edge of the rotatable actuator 36 is contained within the outer tube 12 so that it is axially fixed with respect to the inner tube 22 and moves axially with the inner assembly, but is free to rotate. The rotatable actuator 36 includes protrusions 38 and 40, which are engaged in the outer tube helical slots 18 and 20 in order to guide the rotatable actuator into a rotating motion in response to axial movement of the inner assembly in the outer tube 12. As shown in FIG. 4, the rotatable actuator 36 includes cam surfaces 42, which are configured to urge the orifice members 30 radially in response to rotation of the rotatable actuator. As shown in the example embodiment of the Figures, the cam surfaces 42 comprise curved protrusions that can engage against projections 34 on the orifice members 30, but many other cam configurations can be used such as curved grooves (not shown) on the actuator 36 into which projections on the orifice members 30 can engage. Although ten orifice members 30 are shown in FIG. 3, the number of orifice members (and thus the number of cam and support surface groove or projections required can vary based on factors such as the design and energy-absorbing performance characteristics of the device, properties of the fluid and the orifice member material, how quickly the orifice has to be closed, initial and final sizes of the orifice needed, to name a few. Although adjustment of the orifice size can be achieved with one or two moving orifice members with all or part of the orifice opening profiled into orifice member edge(s), in some embodiments at least three orifice members can be arranged radially evenly spaced around the axis to provide a radially symmetrical orifice size adjustment in response to an energy event.

The energy-absorbing assembly 10 can absorb energy through rate-controlled transfer of a fluid (e.g., a hydraulic fluid or a compressed gas) from a cavity in the outer tube 12 between the inner tube 22 first end and the outer tube 12 second end, through the orifice 26 to a cavity in the inner tube 22 between the inner tube 12 first end and the inner tube 12 second end. As a load is applied (e.g., a seat is loaded by the occupant during crash conditions), load is transferred through the energy-absorbing assembly 10 to a support (e.g., an aircraft cabin floor or structural support). Once a predetermined limit load is reached (e.g., 14.5G), the membrane 28 fails and the loaded outer tube 12 begins to push fluid down into the inner tube 22 through into the inner tube 22 through the orifice 26. As the outer tube 12 strokes down, the rotatable actuator 36 is forced to follow the helical grooves 18, 20 on the outer tube 12 and rotates in response to the downward stroke. As the protrusions 34 on the orifice members 30 are engaged with the curved profiles of the cam surfaces 42 on the actuator 36, the blades are compelled to move radially inward. Since the orifice members 30 are engaged with the radial grooves 32 on the radial support member 24, the movement of the orifice members 30 is constrained to the radially inward direction. This radially inward movement of the orifice members 30 in response to the stroke progressively reduces the size of the orifice in proportion to the magnitude of the stroke. As the diameter of orifice 26 is reduced, the force required to push the fluid through the orifice increases. In some embodiments, this can provide a technical effect of greater energy absorption by dynamically changing the orifice diameter.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An energy-absorbing assembly comprising:
an outer assembly comprising an outer hollow cylindrical member comprising a first end and a second end;

an inner assembly comprising an inner hollow cylindrical member comprising a first end disposed in the outer hollow cylindrical member first end and a second end, and a radial support member affixed to or integrated with the inner hollow cylindrical member first end, said inner and outer assemblies axially movably engaged with each other and defining a first cavity inside the outer hollow cylindrical member between the outer hollow cylindrical member second end and the inner assembly radial support member, and a second cavity inside the inner hollow cylindrical member between the inner hollow cylindrical member first end and the inner assembly radial support;

an adjustable-size orifice between the first and second cavities comprising a plurality of orifice members, at least one of which is movably engaged with the radial support;

a rotatable actuator engaged with and in an axially-fixed position with respect to the inner assembly, said actuator helically movably engaged with the outer hollow cylindrical member and configured to rotate in response to axial displacement between the inner and outer assemblies, said actuator including a cam surface engaged with the at least one radially movable orifice member configured to displace the at least one movable orifice member along its movable engagement with the radial support; and a fluid disposed in the first cavity and a membrane that blocks fluid flow through the orifice.

2. The energy-absorbing assembly of claim 1, wherein the orifice comprises a plurality of orifice members movably engaged with the radial support and with the actuator cam surface.

3. The energy-absorbing assembly of claim 1, wherein the orifice comprises at least three orifice members movably engaged with the radial support and with the actuator cam surface.

4. The energy-absorbing assembly of claim 3, wherein the orifice members are arranged circumferentially to form an orifice at a central axis of the inner and outer hollow cylindrical members.

5. The energy-absorbing assembly of claim 1, wherein the outer hollow cylindrical member comprises an axial groove on an inner surface thereof, and the inner assembly comprises a protrusion in sliding engagement with the axial groove.

6. The energy-absorbing assembly of claim 5, wherein the outer hollow cylindrical member comprises a helical groove on the inner surface thereof, and the actuator comprises a protrusion in sliding engagement with the helical groove.

7. The energy-absorbing assembly of claim 1, wherein the outer hollow cylindrical member comprises a helical groove on the inner surface thereof, and the actuator comprises a protrusion in sliding engagement with the helical groove.

8. The energy-absorbing assembly of claim 1, wherein the actuator cam surface comprises a curved extended protrusion engaged with the at least one movably engaged orifice member.

9. The energy-absorbing assembly of claim 1, wherein the at least one movably engaged orifice member comprises a protrusion engaged with a radial groove in the radial support member.

10. An energy-absorbing assembly, comprising:
an outer assembly comprising an outer hollow cylindrical member comprising a first end and a second end, and an inner surface comprising a helical groove and an axial groove;

an inner assembly comprising an inner hollow cylindrical member comprising a first end disposed in the outer hollow cylindrical member first end and a second end, a radial support member comprising a plurality of radial grooves and affixed to or integrated with the inner hollow cylindrical member first end, and a protrusion engaged with the outer hollow cylindrical member inner surface axial groove, a first cavity inside the outer hollow cylindrical member between the outer hollow cylindrical member second end and the inner assembly radial support member, and a second cavity inside the inner hollow cylindrical member between the inner hollow cylindrical member first end and the inner assembly radial support;

an adjustable-size orifice between the first and second cavities comprising a plurality of orifice members individually comprising a protrusion movably engaged with the radial support member radial groove;

a rotatable actuator engaged with and in an axially-fixed position with respect to the inner assembly, said actuator comprising a protrusion movably engaged with the outer hollow cylindrical member inner surface helical groove, said actuator including a plurality of cam surfaces comprising curved extended protrusions engaged with the plurality of movably engaged orifice members configured to displace the movable orifice members along their movable engagement with the radial support; and a fluid disposed in the first cavity and a membrane that blocks fluid flow through the orifice.

11. An occupant seating assembly comprising a seat frame, a support, and the energy-absorbing member of claim 10, wherein one of the inner assembly and the outer assembly is attached to the seat frame and the other of the inner assembly and the outer assembly is attached to the support.

12. An occupant seating assembly comprising a seat frame, a support, and the energy-absorbing member of claim 1, wherein one of the inner assembly and the outer assembly is attached to the seat frame and the other of the inner assembly and the outer assembly is attached to the support.

13. A method of assembling or repairing an occupant seating assembly comprising a seat frame and a support, comprising:
providing an energy-absorbing assembly comprising:
an outer assembly comprising an outer hollow cylindrical member comprising a first end and a second end;
an inner assembly comprising an inner hollow cylindrical member comprising a first end disposed in the outer hollow cylindrical member first end and a second end, and a radial support member affixed to or integrated with the inner hollow cylindrical member first end, said inner and outer assemblies axially movably engaged with each other and defining a first cavity inside the outer hollow cylindrical member between the outer hollow cylindrical member second end and the inner assembly radial support member, and a second cavity inside the inner hollow cylindrical member between the inner hollow cylindrical member first end and the inner assembly radial support;
an adjustable-size orifice between the first and second cavities comprising a plurality of orifice members, at least one of which is movably engaged with the radial support;
a rotatable actuator engaged with and in an axially-fixed position with respect to the inner assembly, said actuator helically movably engaged with the outer hollow cylindrical member and configured to rotate in response to axial displacement between the inner and outer assemblies, said actuator including a cam surface engaged with the at least one radially movable orifice member configured to displace the at least one movable orifice member along its movable engagement with the radial support; and a fluid disposed in the first cavity and a membrane that blocks fluid flow through the orifice;

attaching the seat frame to one of the inner assembly and the outer assembly; and attaching the other of the inner assembly and the outer assembly to the support.

14. The method of claim 13, wherein the orifice comprises a plurality of orifice members movably engaged with the radial support and with the actuator cam surface.

15. The method of claim 13, wherein the orifice comprises at least three orifice members movably engaged with the radial support and with the actuator cam surface, and arranged circumferentially to form an orifice at a central axis of the inner and outer hollow cylindrical members.

16. The method of claim 13, wherein the outer hollow cylindrical member comprises an axial groove and a helical groove on an inner surface thereof, the inner assembly comprises a protrusion in sliding engagement with the axial groove, and the actuator comprises a protrusion in sliding engagement with the helical groove.

17. The method of claim 13, wherein the actuator cam surface comprises a curved extended protrusion engaged with the at least one movably engaged orifice member.

18. The method of claim 13, wherein the at least one movably engaged orifice member comprises a protrusion engaged with a radial groove in the radial support member.

19. A method of absorbing energy, comprising applying a compressive load to the energy-absorbing member of claim 1 initiate a stroke motion comprising penetration of the inner assembly into the outer hollow cylindrical member and apply pressure to the fluid in the first cavity, breaking the membrane with pressure from the fluid in the first cavity, and actuating the movably engaged orifice member(s) in response to the stroke motion to reduce the size of the orifice.

20. The energy-absorbing assembly of claim 1, wherein:

the outer hollow cylindrical member further comprises an inner surface comprising a helical groove and an axial groove;

the inner assembly further comprises a protrusion engaged with the outer hollow cylindrical member inner surface axial groove;

each of the plurality of orifice members a protrusion movably engaged with the radial support member radial groove; and the rotatable actuator includes a protrusion movably engaged with the outer hollow cylindrical member inner surface helical groove, and further includes a plurality of cam surfaces comprising curved extended protrusions engaged with the plurality of movably engaged orifice members configured to displace the movable orifice members along their movable engagement with the radial support.

* * * * *